(No Model.)
O. W. SMITH.
SLED BRAKE.
No. 352,984. Patented Nov. 23, 1886.
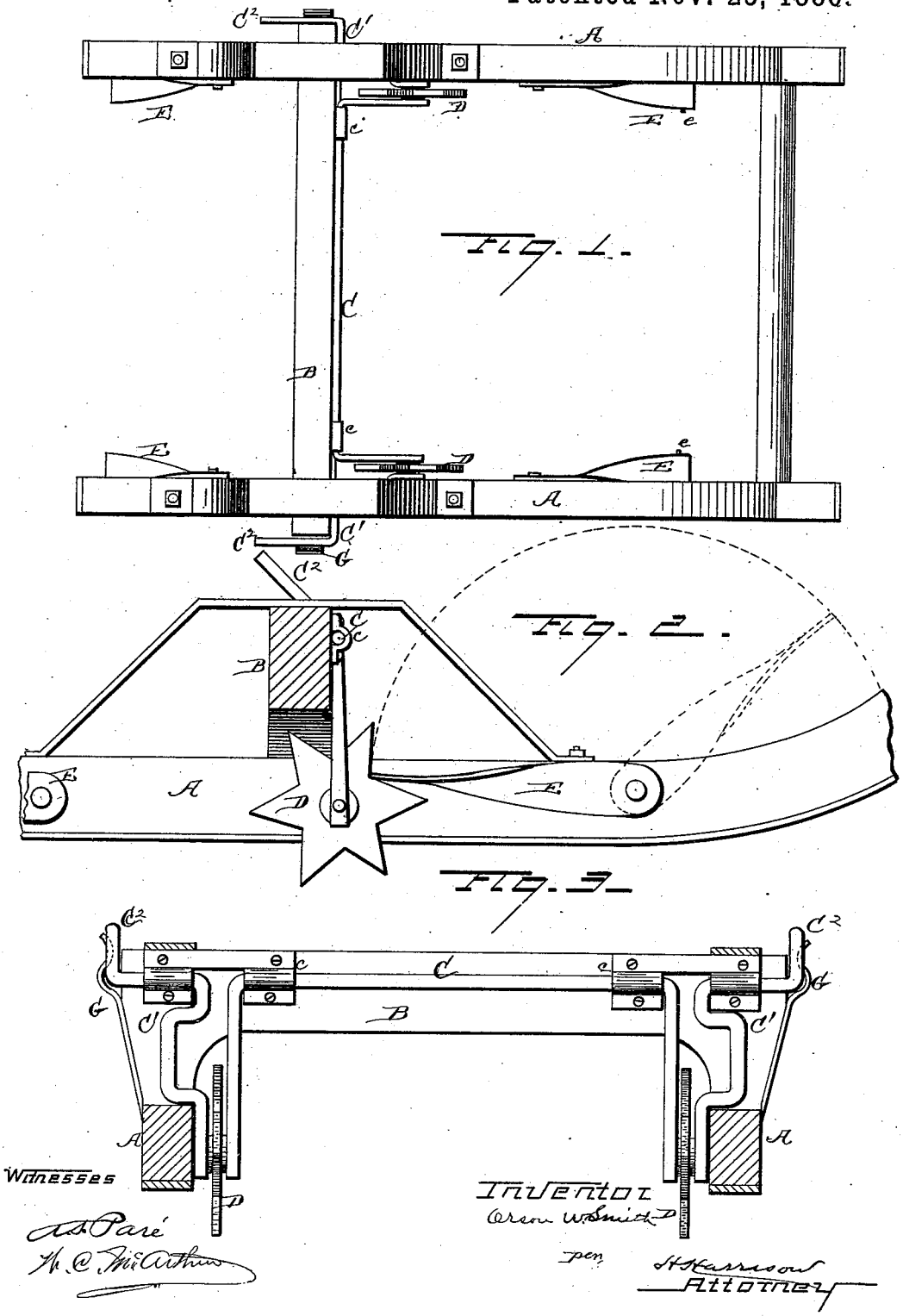

UNITED STATES PATENT OFFICE.

ORSON WHITE SMITH, OF CHARLEVOIX, MICHIGAN.

SLED-BRAKE.

SPECIFICATION forming part of Letters Patent No. 352,984, dated November 23, 1886.

Application filed January 5, 1885. Renewed April 10, 1886. Serial No. 198,512. (No model.)

*To all whom it may concern:*

Be it known that I, ORSON WHITE SMITH, a citizen of the United States, residing at Charlevoix, in the county of Charlevoix and State of Michigan, have invented certain new and useful Improvements in Sled-Brakes, of which the following is a specification, to wit:

This invention relates to sled-brakes; and it consists in the peculiar construction and arrangement of the same, substantially as will be hereinafter more fully described and claimed.

In order to enable others skilled in the art to which my invention appertains to make and use the same, I will now proceed to describe its construction and operation, referring to the accompanying drawings, in which—

Figure 1 is a plan view of a sled having my brake attached. Fig. 2 is a longitudinal section of the same, and Fig. 3 is a transverse section in front of the knee.

A represents the runners of a bob-sled of the ordinary form, having the knees B, as shown. Supported in suitable boxes, $c\ c$, on one side of these knees B is a transverse shaft, C, having its ends bent downward at right angles, and just beyond the ends of this shaft are journaled two other shafts, C', having one bent down to correspond with the end of the shaft C, and the other bent upward to form a handle, $C^2$. Between the lower ends of the shafts C C' C' are journaled two notched or star wheels, D, which, when thrown down, project below the runners A and engage the snow beneath.

E represents four pawls, two of which are pivoted upon each runner, one in front and one in rear of the position of the star-wheel, and in a suitable position to engage therewith when turned down for that purpose. Normally these dogs or pawls are thrown over away from the wheels and rest upon pins or stops $e\ e$ in the runners.

Upon the outer sides of the knees B are secured spring-arms G, and when the wheels are raised the handles $C^2$ are held between the knee and spring, as will be evident in Fig. 3.

This device can readily be attached to any sled, and when not in use is held from contact with the ground by throwing back the handles $C^2$ and engaging them with the springs G. When desired for use, the wheels are thrown down, and if the sled is to be held back while descending the hill the forward pawls, E, are thrown into engagement with the wheels and prevent their turning. To lock a sled from running back while ascending a hill, the rear pawls are engaged to hold the wheels in the opposite direction.

If desired, the shafts C C' may be made in one piece cranked at the proper points and the star-wheels secured at these points. These wheels are also formed with any desired number of teeth.

Having thus fully described my invention, what I claim as new, and desire to secure by Letters Patent, is—

1. The combination, with a sled, of a cranked shaft running transversely of the same, and provided with notched or star wheels, and pawls placed upon the runners and adapted to engage these wheels to hold them stationary, substantially as shown and described.

2. The sled A B, having the pawls E in front and rear of its knees, and the springs G upon their sides, in combination with the cranked shafts C C', handles $C^2$, and notched wheels D, substantially as and for the purpose set forth.

In testimony whereof I affix my signature in presence of two witnesses.

ORSON WHITE SMITH.

Witnesses:
CHARLES ELY,
WILLIAM C. ALHEIT.